US012392289B2

(12) United States Patent
Ortiz et al.

(10) Patent No.: US 12,392,289 B2
(45) Date of Patent: Aug. 19, 2025

(54) ACTIVE BLEED FLOW MODULATION

(71) Applicant: RTX Corporation, Farmington, CT (US)

(72) Inventors: Jonathan Ortiz, Torrance, CA (US); William K. Ackermann, East Hartford, CT (US); Matthew P. Forcier, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 15/601,499

(22) Filed: May 22, 2017

(65) Prior Publication Data

US 2018/0334962 A1   Nov. 22, 2018

(51) Int. Cl.
| | |
|---|---|
| F02C 7/18 | (2006.01) |
| F02C 6/08 | (2006.01) |
| F02C 9/18 | (2006.01) |
| F02C 7/057 | (2006.01) |
| F16K 31/00 | (2006.01) |

(52) U.S. Cl.
CPC ............... *F02C 7/18* (2013.01); *F02C 6/08* (2013.01); *F02C 9/18* (2013.01); *F01P 2023/00* (2013.01); *F01P 2025/04* (2013.01); *F01P 2025/08* (2013.01); *F02C 7/057* (2013.01); *F05D 2270/301* (2013.01); *F05D 2270/303* (2013.01); *F16K 31/00* (2013.01)

(58) Field of Classification Search
None
See application file for complete search history.

(56) References Cited

U.S. PATENT DOCUMENTS

| | | | |
|---|---|---|---|
| 4,893,984 A | 1/1990 | Davison et al. | |
| 4,991,389 A * | 2/1991 | Schafer | F04D 27/0223 60/39.24 |
| 5,063,963 A | 11/1991 | Smith | |

(Continued)

FOREIGN PATENT DOCUMENTS

| | | |
|---|---|---|
| EP | 0330492 A2 | 8/1989 |
| EP | 0507725 A1 | 10/1992 |

(Continued)

OTHER PUBLICATIONS

European Search Report Issued In EP Application No. 18173677.8, Mail Date Oct. 4, 2018, 9 Pages.

(Continued)

*Primary Examiner* — Devon C Kramer
*Assistant Examiner* — Rodolphe Andre Chabreyrie
(74) *Attorney, Agent, or Firm* — CANTOR COLBURN LLP

(57) ABSTRACT

A bleed air cooling system for a gas turbine engine includes a bleed port located at an axial location of the gas turbine engine to divert a bleed airflow from a gas turbine engine flowpath, a bleed outlet located at a cooling location of the gas turbine engine and a bleed duct in fluid communication with the bleed port and the configured to convey the bleed airflow from the bleed port to the bleed outlet. A modulating valve is located at the bleed duct and is movable between a fully open position and a fully closed position to regulate the bleed airflow through the bleed duct based on one or more operating conditions of the gas turbine engine.

7 Claims, 3 Drawing Sheets

(56) References Cited

U.S. PATENT DOCUMENTS

| | | | |
|---|---|---|---|
| 5,584,511 A * | 12/1996 | Gonzalez | F16L 27/11 285/271 |
| 6,487,863 B1 * | 12/2002 | Chen | F02C 6/08 60/39.12 |
| 6,615,574 B1 * | 9/2003 | Marks | F02C 7/18 60/772 |
| 6,910,851 B2 | 6/2005 | Franconi et al. | |
| 6,931,859 B2 | 8/2005 | Morgan et al. | |
| 6,981,841 B2 | 1/2006 | Krammer et al. | |
| 8,057,157 B2 | 11/2011 | Roush et al. | |
| 8,240,153 B2 | 8/2012 | Childers et al. | |
| 9,097,138 B2 | 8/2015 | Glahn et al. | |
| 9,261,022 B2 | 2/2016 | Saha et al. | |
| 9,482,236 B2 | 11/2016 | Khalid et al. | |
| 2007/0137213 A1 * | 6/2007 | Rickert | F02C 7/125 60/782 |
| 2013/0028705 A1 * | 1/2013 | Lagueux | F01D 11/24 415/146 |
| 2015/0104289 A1 | 4/2015 | Mackin et al. | |
| 2015/0252683 A1 * | 9/2015 | Hasting | F02C 6/08 415/176 |
| 2015/0275758 A1 * | 10/2015 | Foutch | F02C 7/047 60/779 |
| 2016/0090917 A1 * | 3/2016 | Bruno | B64D 13/06 415/145 |
| 2016/0167792 A1 * | 6/2016 | Greenberg | F01D 21/003 415/116 |
| 2016/0376981 A1 * | 12/2016 | Ullyott | F01C 1/22 60/607 |
| 2017/0002740 A1 * | 1/2017 | Robson | F01D 25/12 |
| 2017/0234224 A1 * | 8/2017 | Adibhatla | G05B 23/0289 60/226.1 |
| 2018/0057172 A1 * | 3/2018 | Sautron | B64D 13/02 |
| 2018/0142625 A1 * | 5/2018 | Findlay | F02C 9/18 |
| 2018/0298817 A1 * | 10/2018 | Kalya | F04D 27/009 |

FOREIGN PATENT DOCUMENTS

| | | |
|---|---|---|
| GB | 1581855 A | 12/1980 |
| WO | 2015026432 A1 | 2/2015 |

OTHER PUBLICATIONS

European Office Action for European Application No. 18173677.8, dated Apr. 16, 2020, 5 pages.

\* cited by examiner

ACTIVE BLEED FLOW MODULATION

BACKGROUND

Exemplary embodiments pertain to the art of gas turbine engines. More particularly, the present disclosure relates to cooling of components of the gas turbine engine via bleed air flow.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

In a gas turbine engine, cooling air is often provided from the compressor to the turbine section to reduce component temperature in the turbine section and improve overall gas turbine engine operation. In some gas turbine engines, air from the high compressor discharge is passed through a heat exchanger, which may be located in a fan bypass duct and then delivered into the turbine section as cooling air. The air from the downstream most end of the compressor section is at elevated temperatures, relative to air at other portions of the compressor section.

Running the operating temperatures in the turbine section at high temperatures provides efficiency gains in the gas turbine engine; however, the high temperatures are exceeding material limits and are driving the need for improved cooling air. That is, conventional cooling air methods often require large amounts of airflow to provide cooling air at sufficient pressure to be introduced to the highest pressure places of the gas turbine engine and at cool enough temperature to reduce key component temperatures.

BRIEF DESCRIPTION

In one embodiment, a bleed air cooling system for a gas turbine engine includes a bleed port located at an axial location of the gas turbine engine to divert a bleed airflow from a gas turbine engine flowpath, a bleed outlet located at a cooling location of the gas turbine engine and a bleed duct in fluid communication with the bleed port and the configured to convey the bleed airflow from the bleed port to the bleed outlet. A modulating valve is located at the bleed duct and is movable between a fully open position and a fully closed position to regulate the bleed airflow through the bleed duct based on one or more operating conditions of the gas turbine engine.

Additionally or alternatively, in this or other embodiments the one or more operating conditions are one or more properties of the bleed airflow entering the bleed port.

Additionally or alternatively, in this or other embodiments one or more sensors are located at the bleed duct to sense the one or more operating conditions, the modulating valve responsive to the one or more operating conditions sensed by the one or more sensors.

Additionally or alternatively, in this or other embodiments the one or more sensors include a pressure sensor or a temperature sensor.

Additionally or alternatively, in this or other embodiments a control system is operably connected to the modulating valve and is configured to command the modulating valve to a selected position based on the one or more operating conditions.

Additionally or alternatively, in this or other embodiments the bleed airflow is diverted from a high pressure compressor of the gas turbine engine.

Additionally or alternatively, in this or other embodiments the bleed outlet is located at a turbine section of the gas turbine engine.

In another embodiment, a gas turbine engine includes a compressor section, a turbine section operably connected to the compressor section, and a bleed air cooling system. The bleed air cooling system includes a bleed port located at the compressor section to divert a bleed airflow from a gas turbine engine flowpath, a bleed outlet located at a cooling location of the gas turbine engine, and a bleed duct in fluid communication with the bleed port and the configured to convey the bleed airflow from the bleed port to the bleed outlet. A modulating valve is located at the bleed duct, and is movable between a fully open position and a fully closed position to regulate the bleed airflow through the bleed duct based on one or more operating conditions of the gas turbine engine.

Additionally or alternatively, in this or other embodiments the one or more operating conditions are one or more properties of the bleed airflow entering the bleed port.

Additionally or alternatively, in this or other embodiments one or more sensors are located at the bleed duct to sense the one or more operating conditions, the modulating valve responsive to the one or more operating conditions sensed by the one or more sensors.

Additionally or alternatively, in this or other embodiments the one or more sensors include a pressure sensor or a temperature sensor.

Additionally or alternatively, in this or other embodiments a control system is operably connected to the modulating valve and is configured to command the modulating valve to a selected position based on the one or more operating conditions.

Additionally or alternatively, in this or other embodiments the bleed airflow is diverted from a high pressure compressor of the gas turbine engine.

Additionally or alternatively, in this or other embodiments the bleed outlet is located at the turbine section of the gas turbine engine.

In yet another embodiment, a method of cooling one or more components of a gas turbine engine includes urging a bleed airflow through a bleed port located at a first axial location of a compressor section of a gas turbine engine, flowing the bleed airflow through a bleed duct toward a bleed outlet located at a cooling location, sensing one or more operating conditions of the gas turbine engine, and operating a modulating valve located in the bleed duct based on the sensed operating conditions to regulate the bleed airflow through the bleed duct.

Additionally or alternatively, in this or other embodiments sensing the one or more operating conditions includes sensing one or more of a pressure or a temperature of the bleed airflow entering the bleed duct.

Additionally or alternatively, in this or other embodiments the modulating valve is movable between a fully open position and a fully closed position.

Additionally or alternatively, in this or other embodiments operating of the modulating valve is commanded via a command from a control system operably connected to the modulating valve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
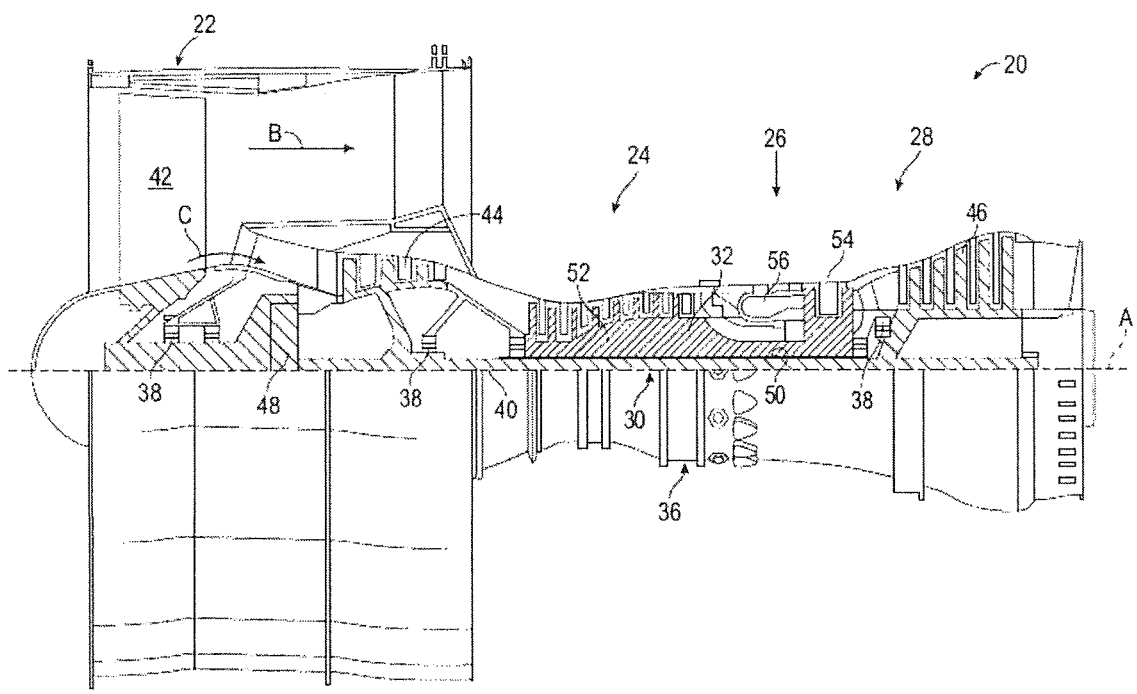
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 m/sec).

Figure 2:
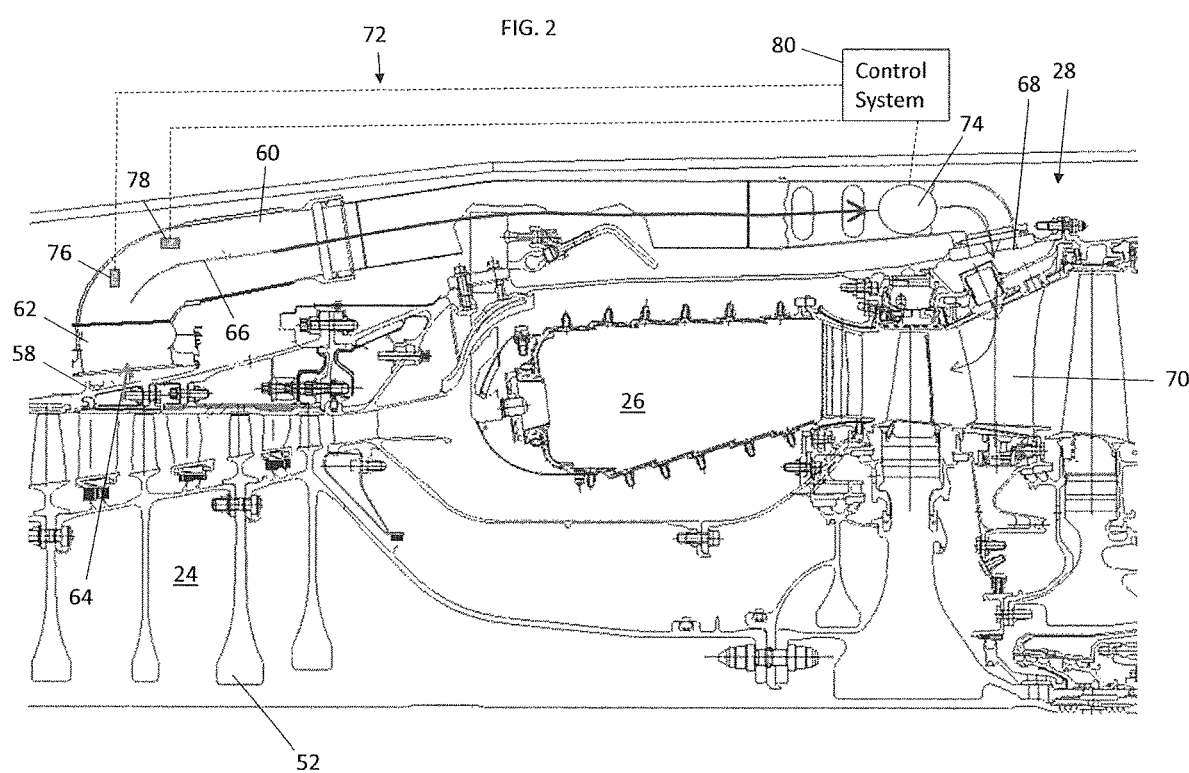
FIG. 2 is a schematic view of an embodiment of a bleed system for a gas turbine engine.

Referring now to FIG. 2, illustrated is an embodiment of a bleed air cooling system 72 for the gas turbine engine 10. In this embodiment, the compressor section 24 includes a bleed port 58 connected to a bleed duct 60 via bleed manifold 62. In some embodiments, the bleed port 58 is located at the high pressure compressor 52 to divert high pressure compressor airflow 64 from the high pressure compressor 52 into the bleed duct 60 as bleed airflow 66. The bleed airflow 66 is directed downstream along the bleed duct 60 to one or more locations of, for example, the turbine section 28 to provide cooling for one or more components thereat. In the embodiment of FIG. 2, a turbine manifold 68 is connected to the bleed duct 60, and extends at least partially around a perimeter of the turbine section 28 to allow for distribution of the bleed airflow 66 to multiple circumferential locations of the turbine section 28. In some embodiments, the turbine manifold 68 extends completely around the perimeter of the turbine section 28. The bleed airflow 66 flows from the turbine manifold 68 to cool one or more components of the turbine section 28, for example, one or more turbine airfoils 70.

Under some operating conditions of the bleed air cooling system 72 and/or of the gas turbine engine 10, it is desired to provide an increased or decreased flow of bleed airflow 66 to the turbine manifold 68, to modulate the bleed airflow 66. To accomplish this modulation of the bleed airflow 66, a modulating valve 74 is located in the bleed air cooling system 72, for example, along the bleed duct 60 between the bleed manifold 62 and the turbine manifold 68. The modulating valve 74 can be positioned anywhere between a fully opened position and a fully closed position such that a flow rate of the bleed airflow 66 through the bleed duct 60 is customizable based on selected operating conditions.

The bleed air cooling system 72 of the present disclosure is an active system, in that one or more sensors are utilized to determine one or more operating conditions and direct setting of the position of the modulating valve 74. The sensors may include a pressure sensor 76 and/or a temperature sensor 78 located along the bleed duct 60, upstream of the modulating valve 74. The pressure sensor 76 and the temperature sensor 78 are configured to sense a pressure and a temperature, respectively, of the bleed airflow 66 directed from the high pressure compressor 52 through the bleed port 58. The pressure sensor 76 and the temperature sensor 78 may be connected to a control system, such as a full authority digital engine control (FADEC) 80, with the modulating valve 74 also operably connected to the FADEC 80. During operation of the bleed air cooling system 72, the FADEC 80 evaluates data from the pressure sensor 76 and/or the temperature sensor 78 to determine a selected position for the modulating valve 74. In addition to, or as an alternative to pressure sensor 76 and/or temperature sensor 78, the FADEC 80 may utilize any of a variety of engine operating characteristics, engine system positions, and/or any of a number of aircraft flight conditions or aircraft systems positions to determine the selected position for the modulating valve 74. A command is then issued from the FADEC 80 to the modulating valve 74 to move the position of the modulating valve 74 to the selected position between fully opened and fully closed. A feedback may be included to determine whether the modulating valve 74 reached the commanded position.

While one bleed duct 60 delivering bleed airflow 66 to one turbine manifold 68 from a single bleed port 58 is shown in FIG. 2, in other embodiments, the single bleed port 58 may be utilized to deliver bleed airflow 66 to two or more turbine manifolds 68. Further, the bleed duct 60 may extend between any compressor 24 location, such as high pressure compressor 52, low pressure compressor 44 or fan 42, to any downstream location, such as high pressure turbine 54 or low pressure turbine 46.

Figure 3:
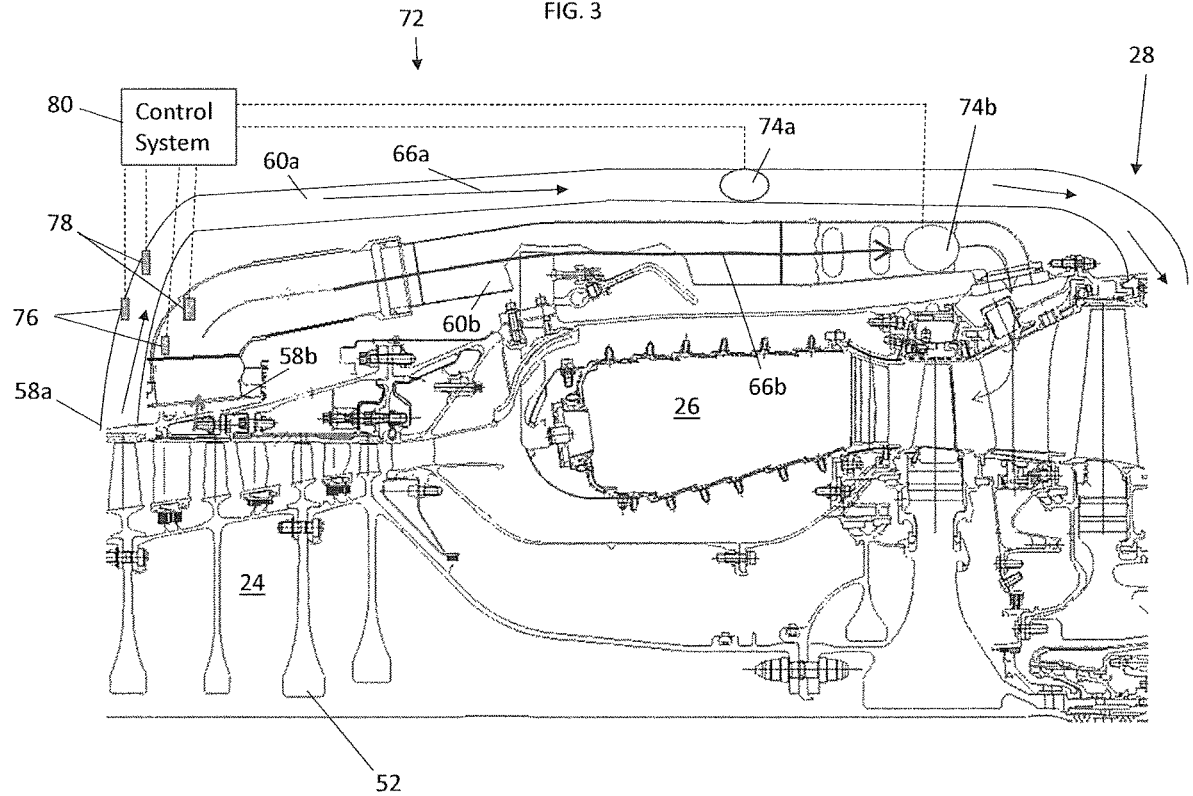
FIG. 3 is a schematic of another embodiment of a bleed system for a gas turbine engine.

In other embodiments, such as illustrated in FIG. 3, multiple bleed ports 58 may be utilized, with a first bleed port 58a located at a first bleed location in the high pressure compressor 52 and a second bleed port 58b located at a second bleed location in the high pressure compressor with, for example, the first bleed port 58a located upstream of the second bleed port 58b, relative to a general direction of airflow through the high pressure compressor 52.

The first bleed port 58a delivers a first bleed airflow 66a to a first turbine manifold 68a via a first bleed duct 60a, while the second bleed port 58b similarly delivers a second bleed airflow 66b to a second turbine manifold 68b via a second bleed duct 60b. Each bleed duct 60a, 60b includes an independently operated modulating valve 74a, 74b, connected to the FADEC 80, which utilizes one or more pressure sensors 76, temperature sensors 78, and/or other operational data to determine a selected position of each modulating valve 74a, 74b, and to command the modulating valves 74a, 74b to their respective selected positions. It is to be appreciated that while two bleed ports 58 and bleed ducts 60 are illustrated in the embodiment of FIG. 3, other quantities of such assemblies, for example, three, four or five modulated bleed ducts 60 may be utilized in the bleed air cooling system 72.

Actively-controlled modulation of the bleed airflow 66 as disclosed herein allows for adaptability of the bleed airflow 66 delivered to the turbine section 28 based on data collected from sensors 76, 78 regarding one or more conditions of the bleed airflow 66 entering the bleed duct 60 from the high pressure compressor 52.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed air cooling system for a gas turbine engine, comprising:
   a bleed port disposed at an axial location of the gas turbine engine to divert a bleed airflow from a gas turbine engine flowpath;
   a bleed outlet disposed at a turbine section of the gas turbine engine;
   two or more turbine manifolds disposed at the turbine section extending completely around a perimeter of the turbine section, the two or more turbine manifolds configured to distribute the bleed airflow to multiple bleed outlet circumferential locations, a first turbine manifold of the two or more turbine manifolds axially spaced apart from a second turbine manifold of the two or more turbine manifolds;
   a bleed duct in fluid communication with the bleed port and configured to convey the bleed airflow from the bleed port to the bleed outlet;
   a modulating valve disposed at the bleed duct, movable between a fully opened position and a fully closed position to regulate the bleed airflow through the bleed duct based on one or more operating conditions of the gas turbine engine flowpath;
one or more sensors disposed at the bleed duct to sense the one or more operating conditions, the modulating valve responsive to the one or more operating conditions sensed by the one or more sensors, the one or more sensors disposed between the bleed port and the modulating valve;
a control system operably connected to the modulating valve and the one or more sensors, the control system configured to evaluate data from the one or more sensors to determine a selected position for modulating valve and command the modulating valve to the selected position;
wherein the modulating valve is configured to be positioned anywhere between the fully opened position and the fully closed position;
wherein the control system comprises a full-authority digital engine control (FADEC);
wherein the one or more operating conditions are one or more properties of the bleed airflow entering the bleed port; and
wherein the one or more sensors include a pressure sensor or a temperature sensor;
wherein the bleed duct includes a radially-extending first portion, and axially extending second portion and a curvilinear transition portion connecting the first portion to the second portion; and
wherein the one or more sensors are disposed in the transition portion.

2. The bleed air cooling system of claim 1, wherein the bleed airflow is diverted from a high pressure compressor of the gas turbine engine.

3. The bleed air cooling system of claim 1, further comprising a feedback to determine whether the modulating valve reached a commanded position.

4. The bleed air cooling system of claim 1, wherein the modulating valve is positioned along the bleed duct nearer to the bleed outlet than to the bleed port.

5. A gas turbine engine, comprising:
a compressor section;
a turbine section operably connected to the compressor section; and
a bleed air cooling system, comprising:
a bleed port disposed at the compressor section to divert a bleed airflow from a gas turbine engine flowpath;
a bleed outlet disposed at the turbine section;
two or more turbine manifolds disposed at the turbine section extending completely around a perimeter of the turbine section, the two or more turbine manifolds configured to distribute the bleed airflow to multiple bleed outlet circumferential locations, a first turbine manifold of the two or more turbine manifolds axially spaced apart from a second turbine manifold of the two or more turbine manifolds;
a bleed duct in fluid communication with the bleed port and configured to convey the bleed airflow from the bleed port to the bleed outlet;
a modulating valve disposed at the bleed duct, movable between a fully opened position and a fully closed position to regulate the bleed airflow through the bleed duct based on one or more operating conditions of the gas turbine engine flowpath;
one or more sensors disposed at the bleed duct to sense the one or more operating conditions, the modulating valve responsive to the one or more operating conditions sensed by the one or more sensors, the one or more sensors disposed between the bleed port and the modulating valve; and
a control system operably connected to the modulating valve and the one or more sensors, the control system configured to evaluate data from the one or more sensors to determine a selected position for modulating valve and command the modulating valve to the selected position;
wherein the modulating valve is positioned along the bleed duct nearer to the bleed outlet than to the bleed port; and
wherein the modulating valve is configured to be positioned anywhere between the fully opened position and the fully closed position;
wherein the control system comprises a full-authority digital engine control (FADEC);
wherein the one or more operating conditions are one or more properties of the bleed airflow entering the bleed port; and
wherein the one or more sensors include a pressure sensor or a temperature sensor;
wherein the bleed duct includes a radially-extending first portion, and axially extending second portion and a curvilinear transition portion connecting the first portion to the second portion; and
wherein the one or more sensors are disposed in the transition portion.

6. The gas turbine engine of claim 5, wherein the bleed airflow is diverted from a high pressure compressor of the gas turbine engine.

7. A method of cooling one or more components of a gas turbine engine, comprising:
urging a bleed airflow through a bleed port disposed at a first axial location of a compressor section of the gas turbine engine;
flowing the bleed airflow through a bleed duct toward a bleed outlet disposed at a turbine section of the gas turbine engine;
two or more turbine manifolds disposed at the turbine section extending completely around a perimeter of the turbine section, the two or more turbine manifolds configured to distribute the bleed airflow to multiple bleed outlet circumferential locations, a first turbine manifold of the two or more turbine manifolds axially spaced apart from a second turbine manifold of the two or more turbine manifolds;
sensing one or more operating conditions of the gas turbine engine flowpath via one or more sensors disposed at the bleed duct to sense the one or more operating conditions, the one or more sensors disposed between the bleed port and a modulating valve disposed in the bleed duct;
evaluating data from the one or more sensors at a control system operably connected to the one or more sensors and the modulating valve;
determining a selected position of the modulating valve via the control system in response to the data from the one or more sensors; and
commanding the modulating valve to the selected position via the control system;
wherein the modulating valve is configured to be positioned anywhere between a fully opened position and a fully closed position;
wherein the control system comprises a full-authority digital engine control (FADEC);

wherein the one or more operating conditions are one or more properties of the bleed airflow entering the bleed port; and wherein the one or more sensors include a pressure sensor or a temperature sensor;

wherein the bleed duct includes a radially-extending first portion, and axially extending second portion and a curvilinear transition portion connecting the first portion to the second portion; and wherein the one or more sensors are disposed in the transition portion.

* * * * *